(12) United States Patent
Wei (10) Patent No.: US 8,722,932 B2
(45) Date of Patent: May 13, 2014

(54) METHOD FOR SEPARATING A MIXTURE COMPRISING THREE COMPONENTS BY SIMULATED MOVING BED CHROMATOGRAPHY

(75) Inventor: Feng Wei, Zhejiang (CN)

(73) Assignee: Ningbo Institute of Technology, Zhejiang University, Zhejiang (CN)

( * ) Notice: Subject to any disclaimer, the term of this patent is extended or adjusted under 35 U.S.C. 154(b) by 161 days.

(21) Appl. No.: 13/232,936

(22) Filed: Sep. 14, 2011

(65) Prior Publication Data

US 2012/0071691 A1 Mar. 22, 2012

(30) Foreign Application Priority Data

Sep. 21, 2010 (CN) .......................... 2010 1 0290708

(51) Int. Cl.
*C07C 231/24* (2006.01)
*B01D 15/08* (2006.01)
*C02F 1/28* (2006.01)

(52) U.S. Cl.
USPC ........................................ 564/216

(58) Field of Classification Search
USPC .................................. 564/216; 210/656, 659
See application file for complete search history.

(56) References Cited

U.S. PATENT DOCUMENTS

| 6,740,243 | B2 * | 5/2004 | Wankat | 210/656 |
| 7,141,172 | B2 * | 11/2006 | Wang et al. | 210/659 |
| 2003/0010716 | A1 * | 1/2003 | Wankat | 210/638 |
| 2003/0216543 | A1 * | 11/2003 | Wang et al. | 530/305 |

FOREIGN PATENT DOCUMENTS

CN 101433775 * 5/2009

* cited by examiner

*Primary Examiner* — Shailendra Kumar
(74) *Attorney, Agent, or Firm* — Pearne & Gordon LLP (57) ABSTRACT

A method for separating a mixture of components by simulated moving bed chromatography: (1) feeding the simulated moving bed such that the eluting power of the liquid phase in the second zone is greater than that of the liquid phase in the third zone, trapping the target component inside the second and the third zone; (2) a solvent for dissolving the mixture to be separated, instead of the feeding solution, is fed into the simulated moving bed through the feeding port, and the eluting power of the liquid phase in the second zone is maintained greater than that of the liquid phase in the third zone, thereby both the pre-impurity and the post-impurity are rinsed off completely, and the target component trapped in the second and the third zone is further purified; and (3) the target component trapped in the simulated moving bed is rinsed off the bed.

9 Claims, 6 Drawing Sheets

Step 1—feeding

Step 2—purification

Step 3—recovery

Fig.1

Step 1—feeding

Step 2—purification

Step 3—recovery

Step 1—feeding

Step 2—purification

Step 3—recovery

METHOD FOR SEPARATING A MIXTURE COMPRISING THREE COMPONENTS BY SIMULATED MOVING BED CHROMATOGRAPHY

CROSS-REFERENCE(S) TO RELATED APPLICATION(S)

This application claims priority to Chinese Patent Application No. 201010290708.7, filed Sep. 21, 2010, which is hereby incorporated by reference in the present disclosure in its entirety.

TECHNICAL FIELD

The present invention relates to a separation method by simulated moving bed chromatography. Specifically, the present invention relates to a method for separating a medium retained component (i.e., the target component) from a mixture comprising three components by simulated moving bed chromatography, more specifically, to a method for separating a mixture comprising three components by simulated moving bed chromatography.

BACKGROUND ART

Simulated moving bed (SMB) chromatography is a continuous chromatographic separation technology. In this technology, many chromatographic columns are connected successively, and the sites for the inlet and the outlet ports are periodically switched along the flow direction of the liquid phase. Therefore, a "simulated" counter-current movement of the solid phase against the liquid phase is achieved, and the mass transfer between the solid phase and the liquid phase is improved, which substantially enhances the chromatographic separation efficiency. Originally, SMB was mainly used in C8 separation in the field of petrochemical industry as well as sugar separation in the field of food industry. SMB is most suitable for the binary separations; thus, it has been successfully introduced into the field of separation of chiral drugs since 1990s and was paid much attention. So far, the principle and the process optimization of the simulated moving bed in binary separations have been studied very deeply and thoroughly.

However, in some cases, there are two or more components other than the target component in the mixture to be treated. According to the elution order on the chromatographic columns used in the SMB process, an impurity eluted before the target component (i.e., an impurity having a retention time shorter than that of the target component) is called a "pre-impurity", and an impurity eluted after the target component (i.e., an impurity having a retention time longer than that of the target component) is called a "post-impurity". The "pre-impurity", the target component, and the "post-impurity" are also called the least, medium and most retained component, respectively, wherein the term "component" indicates a pure substance or a group of pure substances eluted successively. It is particularly common for the separation and purification of natural products, and in such cases, it is difficult to take advantage of a conventional SMB separation method. For example, Professor Bing-chang Lin's research group has encountered this problem during purifying quercetin using SMB, for which they have adopted a process comprising two SMB separation steps: first, the pre-impurities are removed by a first SMB separation, so as to obtain a mixture comprising quercetin and the post-impurities; then, quercetin, as the medium retained target component, is separated from the mixture of quercetin and the post-impurities by a second SMB separation (Li-hua Zhang, Li Juan Gao, Bing-chang Lin. Purification of Quercetin with a Simulated Moving Bed Chromatography, Journal of Anshan Institute of Iron and Steel Technology, 2002,25 (2) : 108-111). However, such a to process is much complicated in application in that the two SMB separation steps cannot be simultaneously carried out on a single device, and the second SMB separation must be carried out after the first SMB separation is completed, which not only increases the consumption of solvents and the wear of the devices, but also involves cumbersome procedures and increases production costs. Therefore, more reasonable solutions are expected to address this issue.

DISCLOSURE OF THE INVENTION

Technical Problem to be Solved by the Invention

Aiming at the defects in the prior art as described above, the object of the present invention is to provide a practical method for separating a mixture comprising three components by simulated moving bed chromatography wherein the medium retained component is isolated by a single SMB separation step, the consumption of solvents and the wear of the devices are reduced, and the separation procedure is simplified.

Technical Solution of the Invention

To solve the above-mentioned technical problem, the present invention provides a simulated moving bed device comprising a first, a second, and a third zone as described in the part of "Simulated moving bed device", and provides technical solutions as follows.

A method for separating a mixture comprising three components by simulated moving bed chromatography, including the following steps:

(1) feeding:

firstly, a solution 1 and a solution 2 are prepared, wherein the ingredients or components composing the solution 1 are the same as those composing the solution 2, but the volume percentage of each ingredient or component may be different in the solution 1 from that in the solution 2, such that the volume percentage of the solvent having strong eluting power in the solution 2 is higher than that of the solvent having strong eluting power in the solution 1;

secondly, the mixture to be purified comprising a pre-impurity (i.e., a least retained component), a target component (i.e., a medium retained component), and a post-impurity (i.e., a most retained component) is dissolved in the solution 1 to prepare a feeding solution; and thirdly, the feeding solution flows into the simulated moving bed through the feeding port, and the solution 2 flows into the simulated moving bed through the eluent-inlet port, and thus, the eluting power of the liquid phase within the second zone is stronger than that of the liquid phase within the third zone, such that in the second zone, the target component moves forward to the third zone along with the liquid phase while in the third zone, the target component moves backward to the second zone with the switch of the columns; thereby the target component is trapped in the second and the third zone, and gradually accumulates; at the same time, the pre-impurity in the second and the third zone moves together with the liquid phase and flows out of the raffinate-outlet together with the raffinate, while the post-impurity in the second and the third zone moves with the switch of the columns and flows out of the extract-outlet together with the extract;

(2) purification: the solution 1, replacing the feeding solution, is fed into the simulated moving bed through the feeding port, and at the same time, the pre-impurity is collected from the raffinate-outlet and the post-impurity is collected from the extract-outlet; thereby the target component trapped in the second and the third zone is further purified; and (3) recovery: the target component trapped in the simulated moving bed is eluted out of the simulated moving bed for recovery.

The above three steps (1) to (3) form a cycle, and once a cycle is finished, the next cycle comprising the same steps will be restarted for separating the next batch of mixture comprising three components, i.e., the operation can be conducted by repeatedly performing feeding-purification-recovery-feeding-purification-recovery- . . . .

In the above step (1), in the simulated moving bed chromatography system, the feeding solution is fed into the feeding port at the same time when the solution 2 is fed into the eluent-inlet port.

The gist of the above separation method is that, in steps (1) and (2), in the second zone the target component moves forward to the third zone along with the liquid phase while in the third zone the target component moves backward to the second zone with the switch of the columns, which requires the migration rate of the target component within the second zone must be greater than that of the target component within the third zone. The migration rate of the target component is dependent upon the eluting power and the flow rate of the liquid phase; however, in steps (1) and (2), the flow rate of the liquid phase in the second zone is always lower than that of the liquid phase in the third zone. Therefore, to meet the aforementioned requirement that the migration rate of the target component within the second zone must be to greater than that of the target component within the third zone, the eluting power of the liquid phase in the second zone must be greater than that of the liquid phase in the third zone. Based on this finding, in the technical solution according to the present invention, the content of the solvent having strong eluting power in the solution 2 is higher than that of the solvent having strong eluting power in the solution 1. Taking a simulated moving bed chromatography using reverse-phase mode for example, if a mixture comprising an organic solvent and water is used as the mobile phase, the content of the organic solvent in the solution 2 is higher than that of the organic solvent in the solution 1, and accordingly, the eluting power of the liquid phase in the second zone is greater than that of the liquid phase in the third zone. In comparison, in a conventional separation by simulated moving bed, the migration rate of the target component within the second zone is always lower than that of the target component within the third zone since the eluting power of the liquid phase in the second zone is equal to that of the liquid phase in the third zone, therefore, the target component cannot be trapped inside the second and the third zone.

<Simulated Moving Bed Device>

The separation method according to the present invention uses a simulated moving bed device comprising a first, a second, and a third zone, each of the three zones comprising one or more chromatographic columns connected in series with each other, wherein the first zone is located between the eluent-inlet and the extract-outlet, the second zone is located between the extract-outlet and the feeding port, and the third zone is located between the feeding port and the raffinate-outlet. The eluent-inlet and the feeding port are each switched to the entrance of the next column along the direction of the liquid flow, while the raffinate-outlet and the extract-outlet are each switched to the exit of the next column along the direction of the liquid flow at predetermined intervals.

As mentioned above, the target component can be trapped inside the second and the third zone and the pre-impurity and the post-impurity can be readily removed as long as the eluting power of the liquid phase in the second zone is greater than that of the liquid phase in the third zone. Therefore, in another embodiment of the present invention, the separation can also be carried out with the same simulated moving bed device as described above except there is a break between the first zone and the second zone. In this event, the separation can be carried out according to the same steps described above for the separation using a simulated moving bed device in which there is no break between the first zone and the second zone, except that, 1) the solution 2 is fed into the simulated moving bed directly through the entrance of the second zone, such that the eluting power of the liquid phase in the second zone is to greater than that of the liquid phase in the third zone, and that, 2) another solution, i.e., the solution 3, is fed into the simulated moving bed through the eluent-inlet, and the liquid flowing out of the first zone is completely collected as the extract. And, in this modified separation process, a mixture comprising three components can be separated once, too. There is no limit on the above mentioned solution 3, as long as it can completely elute the post-impurity out of the first zone. For example, the solution 3 can have the same composition as the solution 2, or the solution 3 can have another composition.

As an improvement within the scope of the technical solutions of the separation method according to the present invention, in the separation process, an additional fourth zone is provided between the raffinate-outlet and the eluent-inlet of the simulated moving bed. In this event, the simulated moving bed is a conventional four-zone simulated moving bed. And the object of separating a mixture comprising three components once can also be achieved using such four-zone simulated moving bed chromatography, despite that sometimes the amount of the stationary phase may have to be increased.

<Step (1)>

In the above step (1) of the separation method according to the present invention, the target component gradually accumulates in the second and the third zone along with the feeding operation, and the chromatographic columns in the second and the third zone inevitably reach the adsorption saturation eventually, such that the target component leaks from the raffinate at which time the chromatographic columns achieve the maximum utilization. The utilization of the column cannot be further increased even if feeding is continued; on the contrary, to continue feeding is just a waste of time and power. On the other hand, if feeding is stopped when the chromatographic columns in the second and the third zone have not yet reached the adsorption saturation, the chromatographic columns fail to be made full use of. Therefore, the chromatographic columns should be fed such that they just reached the adsorption saturation. The point when the chromatographic columns just reached the adsorption saturation is when the target component just starts to leak from the raffinate, which can be determined by detecting the composition of the liquid from the raffinate-outlet. Therefore, it is preferred to stop feeding when the target component accumulates in the second and the third zone, and the chromatographic columns reach the adsorption saturation such that the target component just starts to leak from the raffinate.

<Step (2)>

In the above purification step (2) of the separation method according to the present to invention, the target component in the second and the third zone is continuously purified along with the continuous outflow of the pre-impurity from the third zone and continuous outflow of the post-impurity from the second zone. It is preferred to stop purification when the pre-impurity and the post-impurity are removed completely until both the content of the pre-impurity in the raffinate and the content of the post-impurity in the extract are 0, which is very helpful to the following recovery operation.

<Step (3)>

In the above purification step (2), purification can be stopped and the recovery step (3) can be immediately started in the event where the pre-impurity has been removed completely while there is still post-impurity remained in the second and the third zone, or in the event where the post-impurity has been removed completely while there is still pre-impurity remained in the second and the third zone. The recovery operation is conducted according to different situations: in the event where there are pre-impurity remained and target component trapped but no post-impurity contained in the second and the third zone, the flow rate in the second zone should be reduced, the target component should be collected from the extract-outlet, and the pre-impurity should be collected from the raffinate-outlet; in the event where there are post-impurity remained and target component trapped but no pre-impurity contained in the second and the third zone, the flow rate in the second zone should be increased, the target component should be collected from the raffinate-outlet, and the post-impurity should be collected from the extract-outlet.

In the above recovery step (3), when the purification step (2) is completed such that there is only the target component but neither pre-impurity nor post-impurity contained in the second and the third zone, the target component can be recovered by any of the following three methods.

Method (1): the recovery is conducted under the same condition with that of the purification step (2), except that the flow rate in the second zone is reduced, such that the target component trapped on the chromatographic columns of the second and the third zone moves backward with the switch of the columns, thereby the target component is collected from the extract-outlet.

Method (2): the recovery is conducted under the same condition with that of the purification step (2), except that the solution 2 instead of the solution 1 is fed into the feeding port, such that the target component trapped on the chromatographic columns of the second and the third zone moves along with the liquid phase, thereby the target component is collected from the raffinate-outlet.

Method (3): the recovery is conducted under the same condition with that of the purification step (2), except that the inlets and the outlets for each materiel to be fed are maintained constant without switching at predetermined intervals, thereby the target component is collected from the raffinate-outlet.

Advantages and Beneficial Effects of the Present Invention

1. In the method for separating a mixture comprising three components by simulated moving bed chromatography according to the present invention, the eluting power of the liquid phase in the second zone is greater than that of the liquid phase in the third zone, thereby in the second zone the medium retained component, i.e., the target component, moves forward to the third zone along with the liquid phase while in the third zone the target component moves backward to the second zone with the switch of the columns, such that the target component is trapped in the second and the third zone. By the purification and recovery, the object of separating a mixture comprising three components once can be achieved; besides, solvents and equipment consumption are saved, and costs are reduced.

Figure 2:
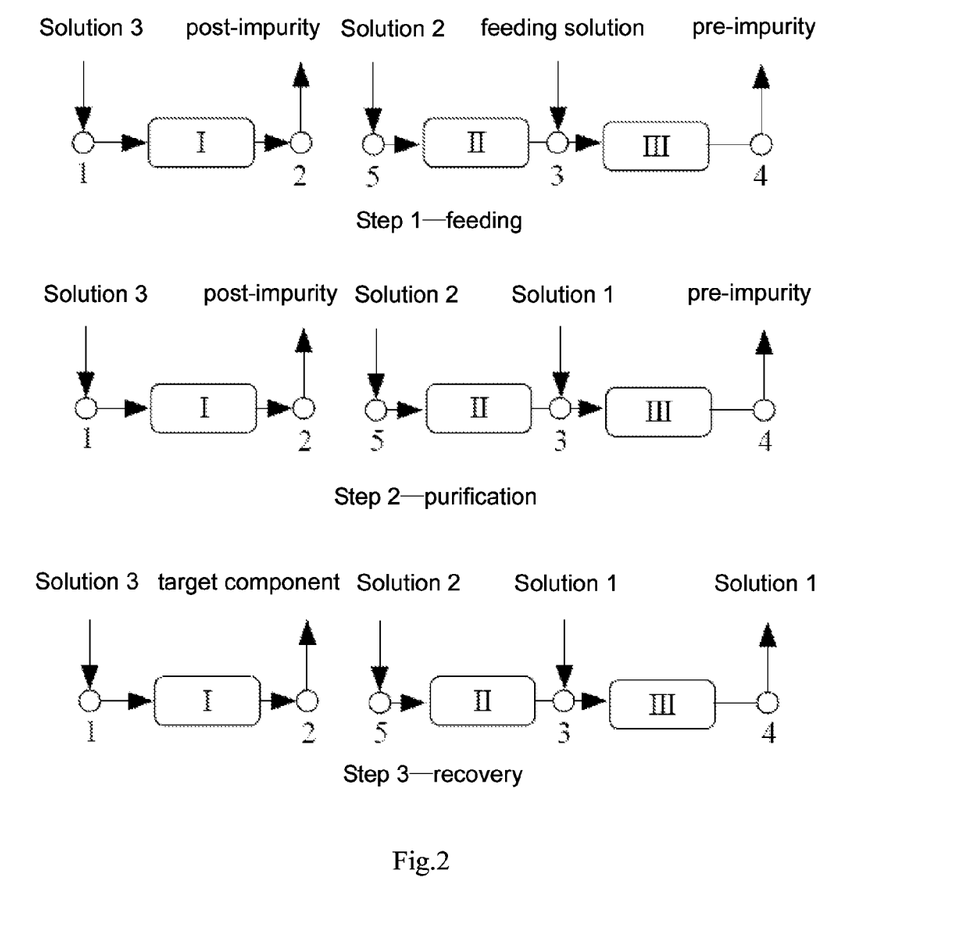
FIG. 2 is a flow chart schematically showing the method for separating a mixture comprising three components using three-zone simulated moving bed chromatography according to the present invention, wherein there is a break between to the first zone and the second zone.
Figure 3:
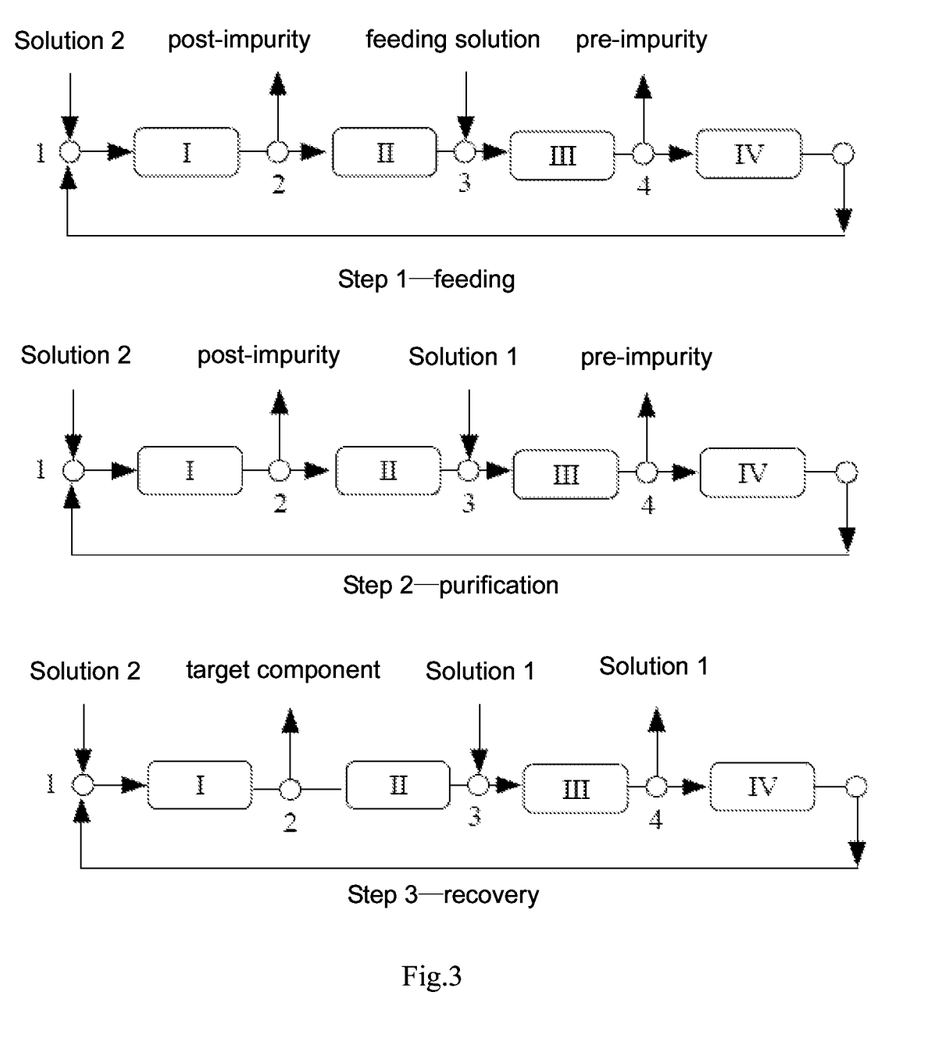
FIG. 3 is a flow chart schematically showing the method for separating a mixture comprising three components using four-zone closed loop simulated moving bed chromatography according to the present invention.
Figure 4:
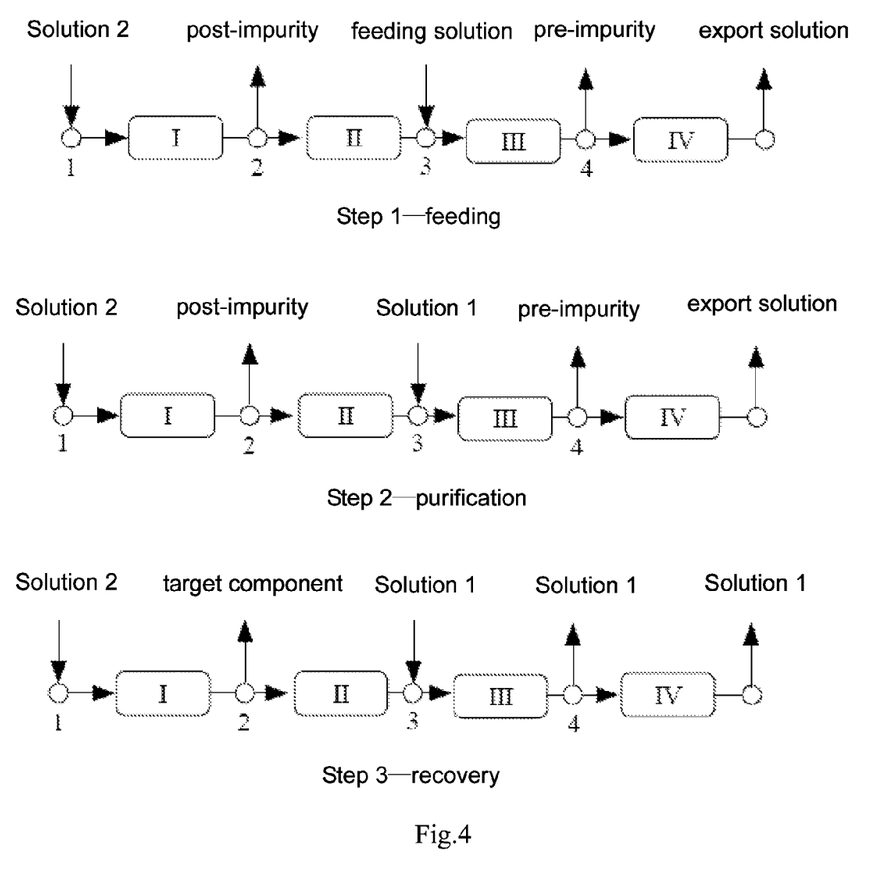
FIG. 4 is a flow chart schematically showing the method for separating a mixture comprising three components using four-zone open loop simulated moving bed chromatography according to the present invention.

2. Alternatively, as shown in FIG. 2, the method of the present invention can also be carried out using a simulated moving bed wherein there is a break between the first zone and the second zone, the solution 2 is fed into the simulated moving bed directly through the entrance of the second zone, and another solution, which can completely elute the post-impurity out of the first zone, is fed into the simulated moving bed through the eluent-inlet to elute the first zone, and the liquid flowing out of the first zone is collected as the extract; or as shown in FIGS. 3 and 4, the method of the present invention can also be carried out using a simulated moving bed wherein an additional zone, i.e., the fourth zone, is provided between the raffinate-outlet and the eluent-inlet. With any of these processes, the object of separating a mixture comprising three components once can be achieved.

BRIEF DESCRIPTION OF THE DRAWINGS

In the recovery step (3) of the method for separating a mixture comprising three components using simulated moving bed chromatography as illustrated in FIGS. 1 to 4, the flow rate of the second zone is set to 0, thus, the liquid flowing out of the third zone is the solution 1.

In FIGS. 1 to 5, the parts indicated by the numerical notations are as follows:
1 eluent-inlet
2 extract-outlet
3 feeding port (i.e., the feeding port for the feeding solution, or the feeding port for the solution 1)
4 raffinate-outlet
5 entrance of the second zone

EMBODIMENTS FOR CARRYING OUT THE INVENTION

Figure 6:
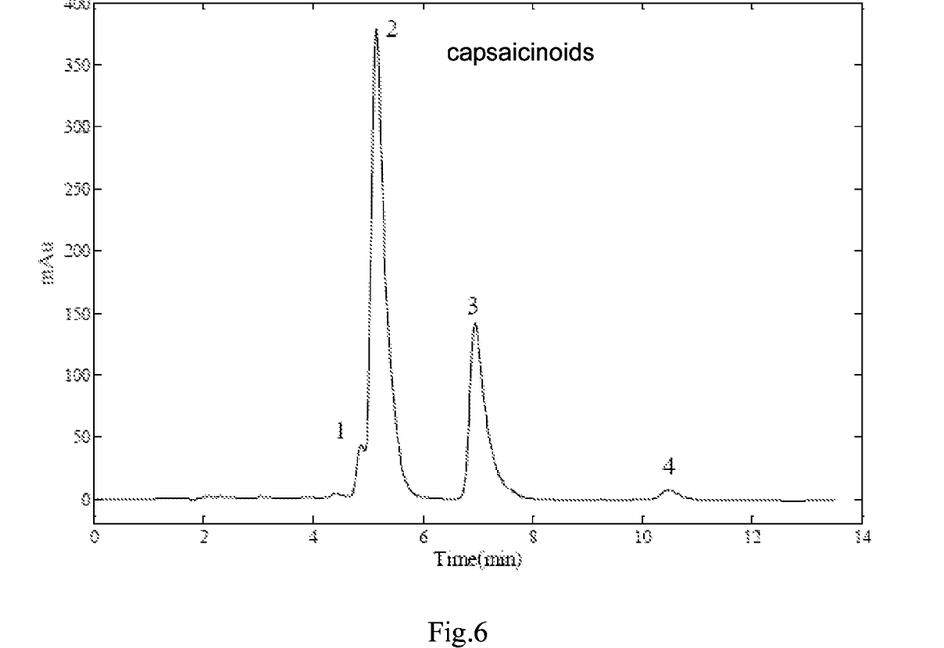
FIG. 6 is the chromatogram of capsaicinoids on the reversed phase chromatographic column, the peaks numbered 1, 2, 3, and 4 indicating nordihydrocapsaicin, capsaicin, dihydrocapsaicin, and homocapsaicin, respectively.

The technical solutions of the present invention will be described in detail with the separation of capsaicinoids as an example. The capsaicinoids to be separated is purchased from Zhengzhou Bis-Biotechnology Co., Ltd. As shown in FIG. 6, on the reversed phase silica column, nordihydrocapsaicin, capsaicin, dihydrocapsaicin and homocapsaicin are eluted out of the column in order, thereby showing four peaks in the chromatogram, wherein the target component is dihydrocapsaicin, the pre-impurities include nordihydrocapsaicin and capsaicin, and the post-impurity is homocapsaicin. By the method for separating a mixture comprising three components using simulated moving bed chromatography according to the present invention, dihydrocapsaicin is successfully isolated from the capsaicinoids.

1. Simulated Moving Bed Chromatography Separation System

Figure 1:
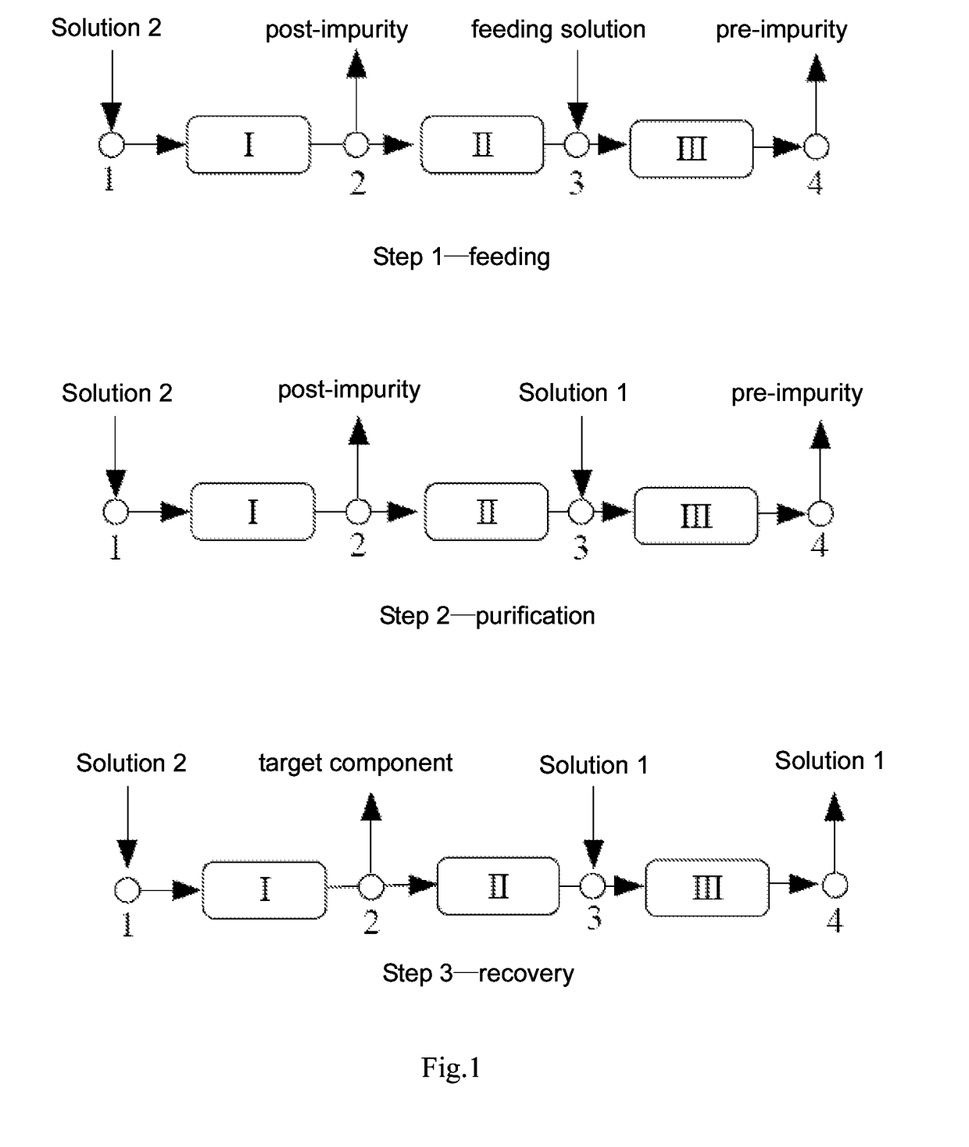
FIG. 1 is a flow chart schematically showing the method for separating a mixture comprising three components using three-zone simulated moving bed chromatography according to the present invention, wherein there is no break between the first zone and the second zone.
Figure 5:
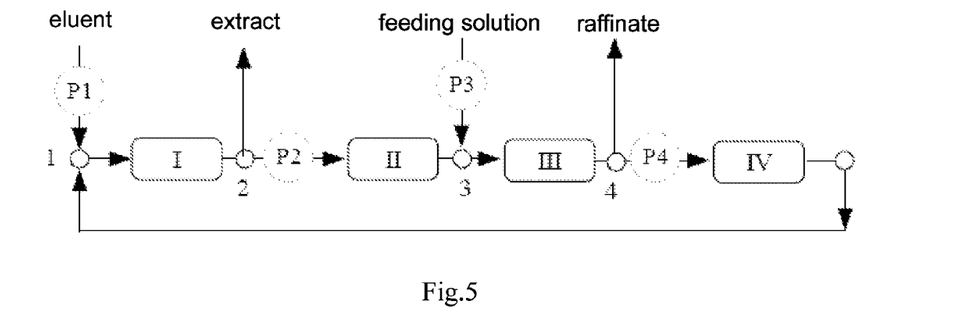
FIG. 5 is a flow chart schematically showing the structure of a conventional simulated moving bed device.

A simulated moving bed chromatography separation system (CSP9116, Knauer GmbH, German) includes the eluent pump P1, the internal circulation pump of the second zone P2, the feeding pump P3, the internal circulation pump of the fourth zone P4, and the chromatographic column. As shown in FIG. 5, the flow rates inside the second and the fourth zone are controlled by the circulation pumps P2 and P4, respectively, while the flow rate inside the first zone is co-controlled by the internal circulation pump of the fourth zone P4 and the eluent pump P1, and the flow rate inside the third zone is co-controlled by the internal circulation pump of the second zone P2 and the feeding pump P3. The system is operated at 30° C. The eluent-inlet and the feeding port are each switched to the entrance of the next column along the direction of the liquid flow, while the raffinate-outlet and the extract-outlet are each switched to the exit of the next column along the direction of the liquid flow at a predetermined interval. By modifying the separation system, the methods for separating a mixture comprising three components by simulated moving bed chromatography according to the present invention can be carried out. For example, in the event the internal circulation pump of the fourth zone P4 is closed, the methods for separating a mixture comprising three components by three-zone simulated moving bed chromatography as illustrated in FIGS. 1 and 2 can be carried out.

2. Separation Steps 1) feeding: a solution 1 and a solution 2 are prepared by mixing methanol with water, such that the volume percentage of methanol, which has strong eluting power, in the solution 2 is higher than that of methanol in the solution 1; the feeding solution is prepared by dissolving the capsaicinoids to be separated, which comprises nordihydrocapsaicin and capsaicin as the pre-impurities, dihydrocapsaicin as the target component, and homocapsaicin as the post-impurity, in the solution 1. Let the feeding solution flow into the simulated moving bed through the feeding port 3, and let solution 2 flow into the simulated moving bed through the eluent-inlet port 1. At the same time, the pre-impurities are collected from the raffinate-outlet 4; and the post-impurity is collected from the extract-outlet. When the target component just starts to leak from the raffinate, the feeding is stopped.

2) purification: the solution 1, replacing the feeding solution, is fed into the simulated moving bed through the feeding port, and the solution 2 is still fed into the simulated moving bed through the eluent-inlet port. At the same time, the pre-impurities are collected from the raffinate-outlet 4 and the post-impurity is collected from the extract-outlet 2. When the pre-impurities and the post-impurity are removed completely until both the content of the pre-impurities in the raffinate and the content of the post-impurity in the extract are 0, the purification is stopped.

3) recovery: the recovery is conducted under the same condition with that of the purification step (2), except that the flow rate inside the second zone is reduced to 0, such that the target component trapped on the chromatographic columns of the second and the third zone moves backward with the switch of the columns, and flows out of the extract outlet 2.

Upon completion of the above steps, another cycle comprising the same steps may be started for separating another batch of mixture comprising three components, i.e. the operation can be conducted by repeatedly performing feeding-purification-recovery-feeding-purification-recovery- . . . .

3. Product Detection

The purity of the product is determined by high performance liquid chromatography. A high performance liquid chromatography system comprising a Knauer K501 pump, Agilent TC-C18 columns (4.6×150 mm, 5 µm) and a Knauer K2501 detector is employed. The analysis is conducted under a condition that the mobile phase comprises methanol/water (70/30 by volume), the flow rate of the mobile phase is 0.5 mL/min, the detected wavelength is 280 nm, and the column temperature is 30° C.

Next, the present invention will be further described with reference to the specific examples. In the following examples, the simulated moving bed chromatography system comprises chromatographic column 1 cm in diameter and 10 cm in length, the packing is C18 silica gel having a particle size of 20 to 45 µm produced by Fuji company (Japan). Two solutions, i.e., the solution 1 and the solution 2, are prepared, the solution 1 comprising methanol/water (60/40 by volume) and the solution 2 comprising methanol/water (80/20 by volume). The capsaicinoids to be separated are dissolved in the solution 1, such that a feeding solution having a concentration of 10 mg/mL is prepared.

EXAMPLE 1 (SEE FIG. 1)

Each of the first, the second, and the third zone consists of two chromatographic columns. And a simulated moving bed device as shown in FIG. 5 is used except that the internal circulation pump of the fourth zone P4 is stopped, such that the simulated moving bed device is equivalent to an open loop simulated moving bed device comprising only three zones.

Figure 7:
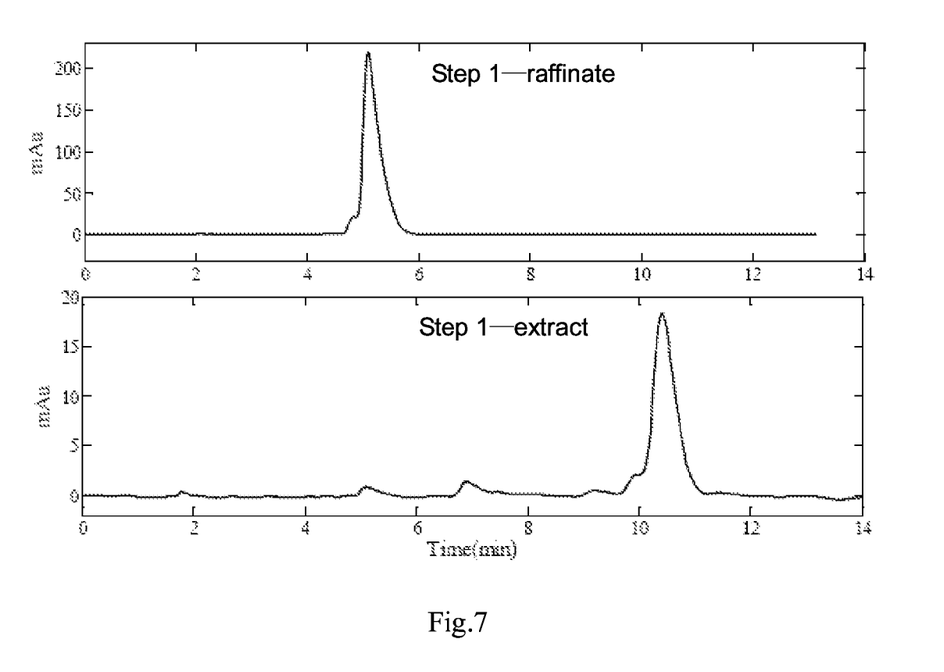
FIG. 7 illustrates the chromatograms of the extract and the raffinate on the reversed phase chromatographic column, respectively, wherein the extract and the raffinate are collected within 161 to 200 minutes in the feeding step of example 1.

Step 1 (feeding): the feeding solution is pumped into the simulated moving bed through the feeding port 3 at a flow rate of 3 mL/min, and meanwhile the solution 2 is pumped into the simulated moving bed through the eluent-inlet port 1 at a flow rate of 4.5 mL/min. The flow rate inside the second zone is controlled to 3 mL/min, and the eluent-inlet 1 and the feeding port 3 are each switched to the entrance of the next column along the direction of the liquid flow, while the raffinate-outlet 4 and the extract-outlet 2 are each switched to the exit of the next column along the direction of the liquid flow at interval of 5 minutes. The composition of each of the raffinate and the extract is detected by high performance liquid chromatography, and the results show that pre-impurities are comprised in the raffinate, post-impurity is comprised in the extract, while the target component is comprised in neither the raffinate nor the extract, which indicates the target component has been effectively trapped within the second and the third zone. After switching for 48 times, i.e., after 240 minutes, the target component starts to leak from the raffinate, which indicates the chromatographic columns have reached the adsorption saturation. In this event, the feeding is stopped. FIG. 7 illustrates the chromatograms of the extract and the raffinate, respectively, wherein the extract and the raffinate are collected within 161 to 200 minutes in the feeding step. From FIG. 7 it can be seen, the target component has been effectively trapped within the second and the third zone since neither the raffinate nor the extract comprises the target component.

Figure 8:
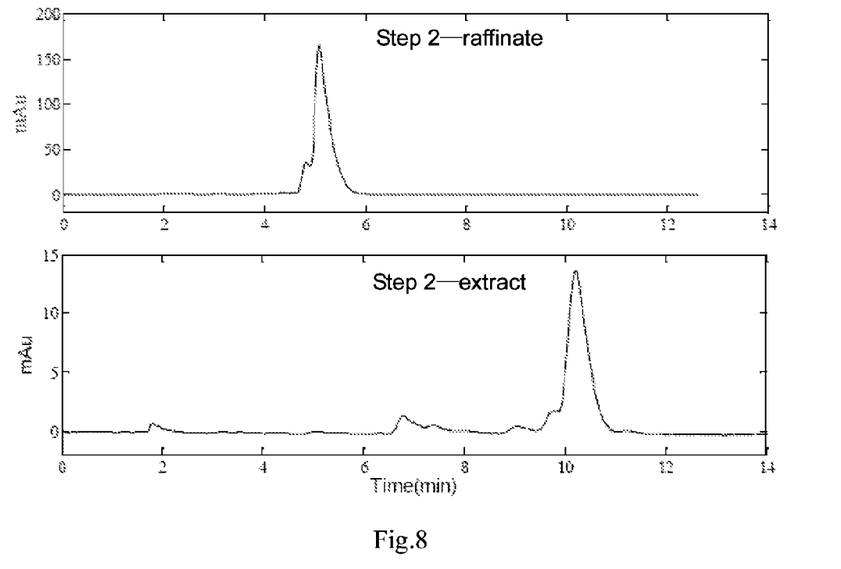
FIG. 8 illustrates the chromatograms of the extract and the raffinate on the reversed phase chromatographic column, respectively, wherein the extract and the raffinate are collected within 41 to 60 minutes in the purification step of example 1.

Step 2 (purification): the solution 1, instead of the feeding solution, is fed into the simulated moving bed through the feeding port, and the solution 2 is still fed into the simulated moving bed through the eluent-inlet port 1. The composition of each of the raffinate and the extract is detected by high performance liquid chromatography. After switching for 32 times, i.e., after 160 minutes, there is neither pre-impurities nor post-impurity observed in the raffinate or the extract. In this event, the purification is stopped. FIG. 8 illustrates the chromatograms of the extract and the raffinate, respectively, wherein the extract and the raffinate are collected within 41 to 60 minutes in the purification step of example. From FIG. 8 it can be seen, there is no target component comprised in either the raffinate or the extract. That is, the target component has been effectively purified within the second and the third zone.

Figure 9:
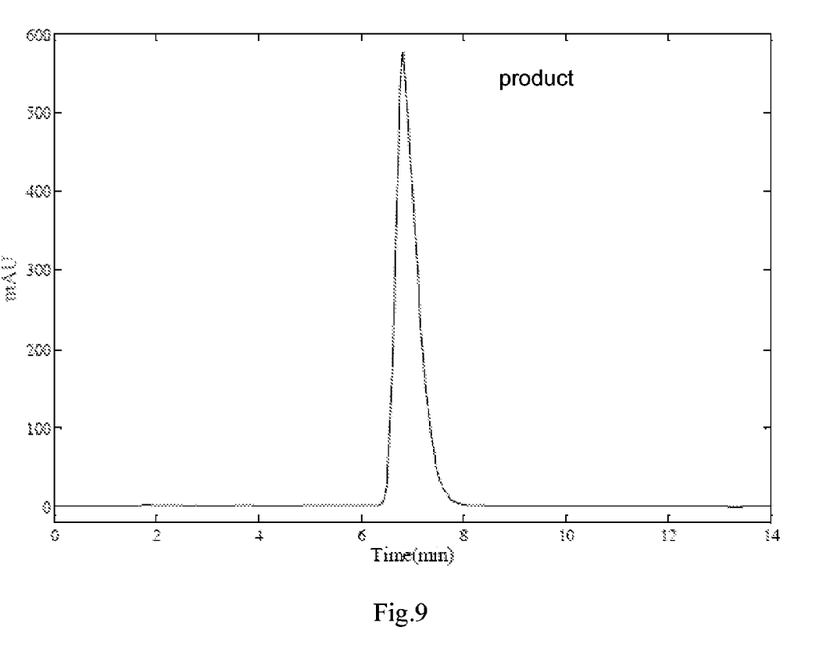
FIG. 9 illustrates the chromatogram of the target product on the reversed phase chromatographic column, wherein the target product is collected in the recovery step of example 1.

Step 3 (recovery): the recovery is conducted under the same condition with that of the purification step (2), except that the internal circulation pump of the second zone is stopped, i.e., the flow rate inside the second zone is reduced to 0. The composition of each of the raffinate and the extract is detected by high performance liquid chromatography. After switching for 8 times, i.e., after 40 minutes, the target component trapped within the second and the third zone has been completely recovered, and only the target component but neither pre-impurities nor post-impurity is comprised in the extract. Upon completion of the recovery, feeding is restarted for the next cycle. FIG. 9 illustrates the chromatogram of the target product in the recovery step. From FIG. 9 it can be seen, there is neither pre-impurities nor post-impurity but the target component comprised in the product solution; besides, the content of the target component in the product solution is higher than that of the target component in the feeding solution.

EXAMPLE 2 (SEE FIG. 2)

The simulated moving bed comprising only three zones as used in Example 1 is used, except there is a break between the first zone and the second zone. The method in this example is carried out in the same manner as that of Example 1, except that the solution 2 is fed directly into the simulated moving bed through the entrance of the second zone, and pure methanol (i.e., the solution 3) is used to elute the first zone, and the liquid flowing out of the first zone is completely collected as the extract. The results show that the purity of the product is identical to that of the product obtained in Example 1.

EXAMPLE 3 (SEE FIG. 3 or 4)

The separation is carried out in the same manner as that of Example 1, except that four-zone simulated moving bed chromatography instead of three-zone simulated moving bed chromatography is used. In the four-zone simulated moving bed, an additional zone, i.e., the fourth zone, is provided between the raffinate-outlet and the eluent-inlet, and each of the first, the second, the third, and the fourth zone consists of two chromatographic columns, the flow rate of the fourth zone being set to 2 mL/min. to The results show that the purity of the product is equivalent to that of the product obtained in Example 1, even if an additional zone is provided.

EXAMPLE 4

The separation is carried out in the same manner as that of Example 1, except that the feeding lasts only for 3 hours, in which event the chromatographic columns of the second and the third zone haven't reached the adsorption saturation. The results show that the object of separating a mixture comprising three components once can also be achieved, the purity of the product being equivalent to that of the product obtained in Example 1 while the content of product being lower than that of the product obtained in Example 1.

EXAMPLE 5

The separation is carried out in the same manner as that of Example 1, except that the feeding lasts for 5 hours, in which event feeding is continued even when the chromatographic columns of the second and the third zone have reached the adsorption saturation. The results show that the object of separating a mixture comprising three components once can also be achieved, the purity and the content of the product being equivalent to those of the product obtained in Example 1, respectively.

EXAMPLE 6

Step 1 (feeding): the feeding is carried out in the same manner as that of Example 1 ;

Step 2 (purification): the solution 1, instead of the feeding solution, is fed into the simulated moving bed through the feeding port, and the solution 2 is still fed into the simulated moving bed through the eluent-inlet port 1. The composition of each of the raffinate and the extract is monitored by high performance liquid chromatography. After switching for 16 times, i.e., after 80 minutes, there is no pre-impurities observed in the raffinate, however, there is still post-impurity observed in the extract, which indicates pre-impurities has been removed while post-impurity still remains. In this event, the purification is stopped.

Step 3 (recovery): the recovery is conducted under the same condition with that of the purification step (2), except that the internal circulation pump of the second zone is increased to 4.0 mL/min. The composition of each of the raffinate and the extract is monitored by high performance liquid chromatography. After switching for 20 times, i.e., after 100 minutes, the target component trapped within the second and the third zone has been completely recovered from the raffinate, and the remained post-impurity is recovered from the extract. Upon completion of the recovery, feeding is restarted for another cycle.

The examples are set forth merely to further illustrate this invention. It is to be understood, however, that while the examples serve this purpose, they are not to be construed in a manner that would unduly limit the scope of the present invention. Although the embodiments of the present invention have been described above in detail, various modifications and alternations of the present invention will become apparent to those skilled in the art without departing from the scope and spirit of the present invention. Accordingly, it is to be understood that the present invention is not to be limited to the above-described, but is to be defined and set forth in the claims and any equivalents thereof.

The invention claimed is:

1. A method for separating a mixture comprising three components by simulated moving bed chromatography, characterized in that, using a simulated moving bed device comprising a first, a second, and a third zone, each of the three zones comprising one or more chromatographic columns connected in series with each other, wherein the first zone is located between the eluent-inlet and the extract-outlet, the second zone is located between the extract-outlet and the feeding port, and the third zone is located between the feeding port and the raffinate-outlet, the method comprising: (1) the step of feeding: firstly, a solution 1 and a solution 2 are prepared, wherein the volume percentage of the solvent having strong eluting power in the solution 2 is higher than that of the solvent having strong eluting power in the solution 1; secondly, the mixture to be purified comprising three components is dissolved in the solution 1 to prepare a feeding solution; thirdly, the feeding solution flows into the simulated moving bed through the feeding port, and the solution 2 flows into the simulated moving bed through the eluent-inlet port, and thus, the eluting power of the liquid phase within the second zone is stronger than that of the liquid phase within the third zone, such that in the second zone, the target component moves forward to the third zone along with the liquid phase while in the third zone, the target component moves backward to the second zone with the switch of the columns; thereby the target component is trapped in the second and the third zone, and gradually accumulates; at the same time, the pre-impurity in the second and the third zone moves together with the liquid phase and flows out of the raffinate-outlet together with the raffinate, while the post-impurity in the second and the third zone moves with the switch of the columns and flows out of the extract-outlet together with the extract; (2) the step of purification: the solution 1, replacing the feeding solution, is fed into the simulated moving bed through the feeding port, and at the same time, the pre-impurity is collected from the raffinate-outlet and the post-impurity is collected from the extract-outlet; thereby the target component trapped in the second and the third zone is further purified; and (3) the step of recovery: the target component trapped in the simulated moving bed is eluted out of the simulated moving bed.

2. The method according to claim 1, characterized in that, in the separation process, there is a break between the first zone and the second zone of the simulated moving bed chromatography, the solution 2 is fed into the simulated moving bed directly through the entrance of the second zone, such that the eluting power of the liquid phase in the second zone is greater than that of the liquid phase in the third zone, and the solution 3, which can elute the post-impurity out of the first zone, is fed into the simulated moving bed through the eluent-inlet, and the liquid flowing out of the first zone is completely collected as the extract.

3. The method according to claim 1, characterized in that, in the separation process, an additional fourth zone is provided between the raffinate-outlet and the eluent-inlet of the simulated moving bed.

4. The method according to claim 1, characterized in that, in the step of feeding, the feeding is stopped when the target component accumulates in the second and the third zone until the chromatographic columns reach the adsorption saturation, such that the target component just starts to leak from the raffinate.

5. The method according to claim 1, characterized in that, in the step of feeding, the feeding is stopped when the target component on the chromatographic columns has not reached saturated adsorption.

6. The method according to claim 1, characterized in that, in the step of feeding, the feeding is stopped when the target component on the chromatographic column has been over-saturated adsorption.

7. The method according to claim 1, characterized in that, in the step of purification, the purification is stopped when the pre-impurity and the post-impurity are removed entirely so that both the content of the pre-impurity in the raffinate and the content of the post-impurity in the extract are 0.

8. The method according claim 1, characterized in that, in the step of purification, the purification is stopped when there are the pre-impurity and the trapped target component but no post-impurity contained in the second and the third zone, and the recovery is conducted by reducing the flow rate in the second zone, collecting the target component from the extract-outlet, and collecting the pre-impurity from the raffinate-outlet.

9. The method according to claim 1, characterized in that, in the step of purification, the purification is stopped when there are the post-impurity and the trapped target component but no pre-impurity contained in the second and the third zone, and the recovery is conducted by increasing the flow rate in the second zone, collecting the target component from the raffinate-outlet, and collecting the post-impurity from the extract-outlet.

* * * * *